(12) United States Patent  (10) Patent No.: US 8,015,328 B2
Sakakida et al.  (45) Date of Patent: Sep. 6, 2011

(54) INFORMATION STORAGE DEVICE, INFORMATION PROCESSING SYSTEM, AND SETTING METHOD OF DATA TRANSFER MODE OF INFORMATION PROCESSING DEVICE

(75) Inventors: Isao Sakakida, Kanagawa (JP); Yoshinori Horiguchi, Kanagawa (JP); Yuu Yamaguchi, Kanagawa (JP); Orie Tsuzuki, Kanagawa (JP); Noriaki Matsuno, Kanagawa (JP); Tomonobu Kurihara, Kanagawa (JP); Tadashi Maeda, Tokyo (JP); Tomoyuki Yamase, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 248 days.

(21) Appl. No.: 12/351,014

(22) Filed: Jan. 9, 2009

(65) Prior Publication Data

US 2009/0187688 A1    Jul. 23, 2009

(30) Foreign Application Priority Data

Jan. 22, 2008  (JP) .................................. 2008-011391

(51) Int. Cl.
 *G06F 13/00*  (2006.01)
 *G06F 3/00*  (2006.01)
(52) U.S. Cl. .................... 710/52; 710/8; 710/22; 710/31
(58) Field of Classification Search ........................ None
See application file for complete search history.

(56) References Cited

U.S. PATENT DOCUMENTS

2003/0090274 A1  5/2003  Kitade
2009/0292875 A1*  11/2009  Therene et al. ................ 711/114

FOREIGN PATENT DOCUMENTS

JP  2007-4251  1/2007

OTHER PUBLICATIONS

How to Manually Disable/Enable Disk Write Caching, Microsoft Support [Online], Nov. 1, 2006 [accessed on Nov. 5, 2010], URL: http://support.microsoft.com/kb/259716.*
Chinese Office Action with English translation of Chinese Application No. 2006100877019.

* cited by examiner

*Primary Examiner* — Tariq Hafiz
*Assistant Examiner* — Scott Sun
(74) *Attorney, Agent, or Firm* — Young & Thompson

(57) ABSTRACT

An information storage device includes a storage that stores transfer data from an information processing device, the information storage device being removably connected to the information processing device, a switch unit that switches a data transfer mode of the information processing device in accordance with manipulation by a user, and a controller that controls the information processing device to transfer data in a mode in which data temporarily stored in a data storing area is transferred to the storage or in a mode in which data is transferred to the storage without being temporarily stored in the data storing area in accordance with the selection of the data transfer mode by the switch unit.

9 Claims, 4 Drawing Sheets

INFORMATION STORAGE DEVICE, INFORMATION PROCESSING SYSTEM, AND SETTING METHOD OF DATA TRANSFER MODE OF INFORMATION PROCESSING DEVICE

BACKGROUND ART

1. Field of the Invention

The present invention relates to an information storage device, an information processing system, and a setting method of a data transfer mode of an information processing device.

2. Description of Related Art

In recent years, as personal computers have become widespread, portable information storage devices that can be removably connected to the personal computers (e.g., USB (Universal Serial Bus) memories and the likes) have also become widely available.

The processing speed of nonvolatile memories, which are embedded in the above-mentioned information storage devices (hereinafter also called "removal disks"), is slow in comparison to that of personal computers. Therefore, data transfer from a personal computer to a removal disk is carried out in such a manner that data is firstly stored in the cache memory (data storing area) of the personal computer for a certain time period, and then actually transferred at proper timing (hereinafter, this process is also called "delay writing").

When a personal computer performs the delay writing, it is necessary to carry out a removal operation (unmounting process) for the removable disk in the OS (Operating System) of the personal computer prior to the actual removal, so that the removable disk is securely removed from the personal computer. If the removable disk is removed from a personal computer at arbitrary timing, it could cause data corruption or a similar harmful effect.

Note that it is also possible to have such a setting on the OS of a personal computer that the above-described delay writing is not carried out. In such a case, the possibility of the data corruption or the like is reduced even if the removable disk is removed from the personal computer at arbitrary timing. However, the processing speed can be set to a higher value, when the personal computer carries out the delay writing.

Although the way of handling and the characteristics of a removal disk are changed depending on the setting of the delay writing as described above, the delay writing is not widely recognized among the users in the first place. Similarly, the way of setting the enabling/disabling of the delay writing is also not widely recognized among the users in the first place.

Incidentally, Japanese Unexamined Patent Application Publication No. 2007-4251 discloses a technique that enables a user to easily carry out an unmounting process with simple manipulation by providing a button for removal in an external storage device.

SUMMARY

The present inventors have found a problem that it has been impossible to easily activate or inactivate the delay writing.

A first exemplary aspect of an embodiment of the present invention is an information storage device including: a storage that stores transfer data from an information processing device, the information storage device being removably connected to the information processing device; a switch unit that switches a data transfer mode of the information processing device in accordance with manipulation by a user; and a controller that controls the information processing device to transfer data in a mode in which data temporarily stored in a data storing area is transferred to the storage or in a mode in which data is transferred to the storage without being temporarily stored in the data storing area in accordance with the selection of the data transfer mode by the switch unit.

By providing the switch unit and the controller in the information storage device, it is possible to set a given operation mode on the information storage device side easily.

Another exemplary aspect of an embodiment of the present invention is an information processing system including: an information processing device capable of selectively transferring data in a first mode in which data temporarily stored in a data storing area is transferred to an external storage area or in a second mode in which data is transferred to the external storage area without being temporarily stored in the data storing area; and an information storage device that is removably connected to the information processing device, the information storage device including: a storage that stores transfer data from the information processing device; a switch unit that switches the first mode or the second mode in accordance with manipulation by a user; and a controller that controls the information processing device to transfer data in the first mode or the second mode based on the selection by the switch unit.

Another exemplary aspect of an embodiment of the present invention is a setting method of a data transfer mode of an information processing device, the setting method including: selecting the data transfer mode of the information processing device by manipulating a switch unit of an information storage device, the information storage device being removably connected to the information processing device; and controlling the information processing device to transfer data in a first mode in which data temporarily stored in a data storing area is transferred to the storage or in a second mode in which data is transferred to the storage without being temporarily stored in the data storing area in accordance with the data transfer mode selected by the switch unit.

In one aspect, the present invention enables to activate or inactivate the delay writing easily.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 1:
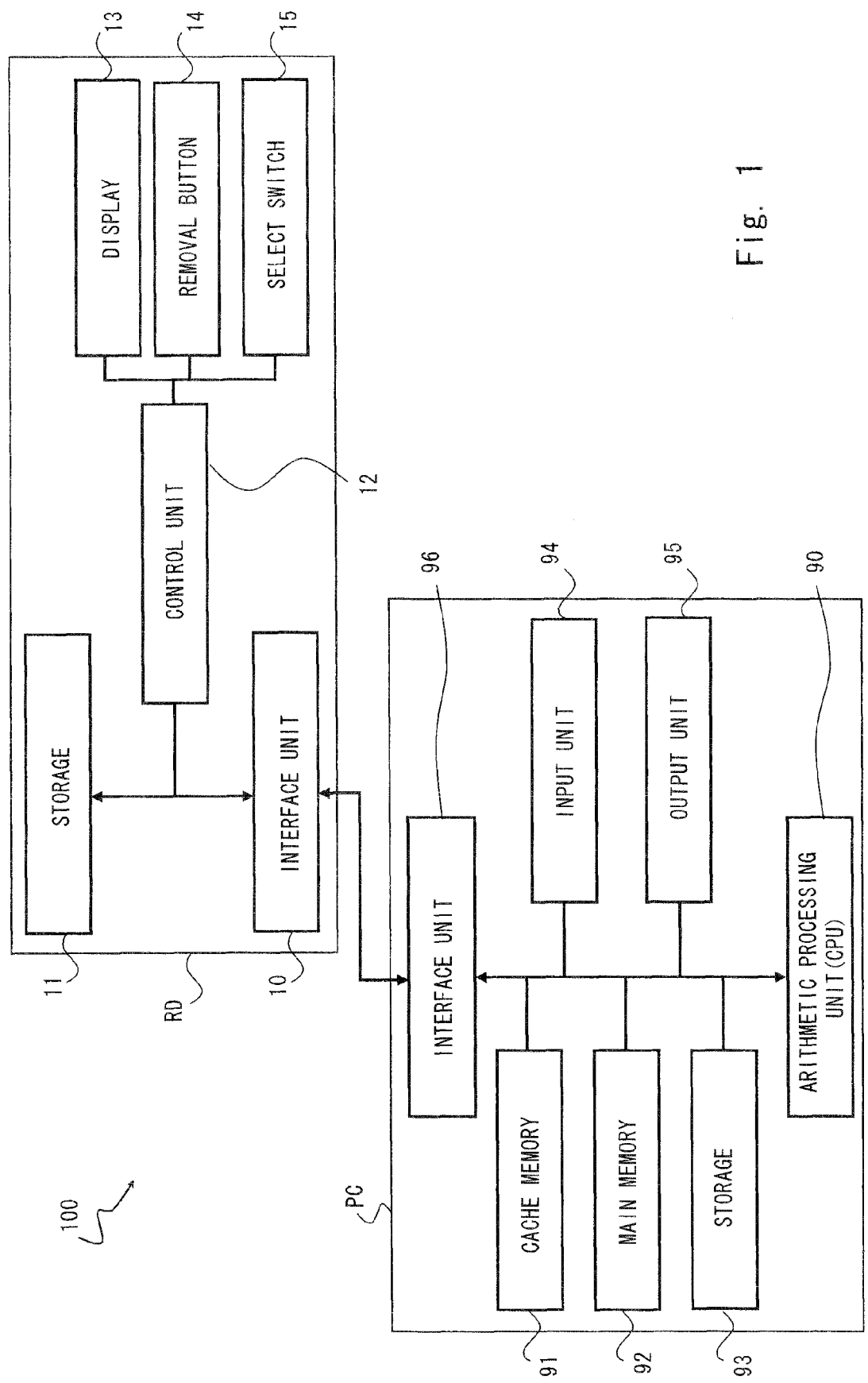
FIG. 1 is a block diagram illustrating a schematic structure of an information processing system in accordance with an exemplary embodiment of the preset invention.
Figure 3:
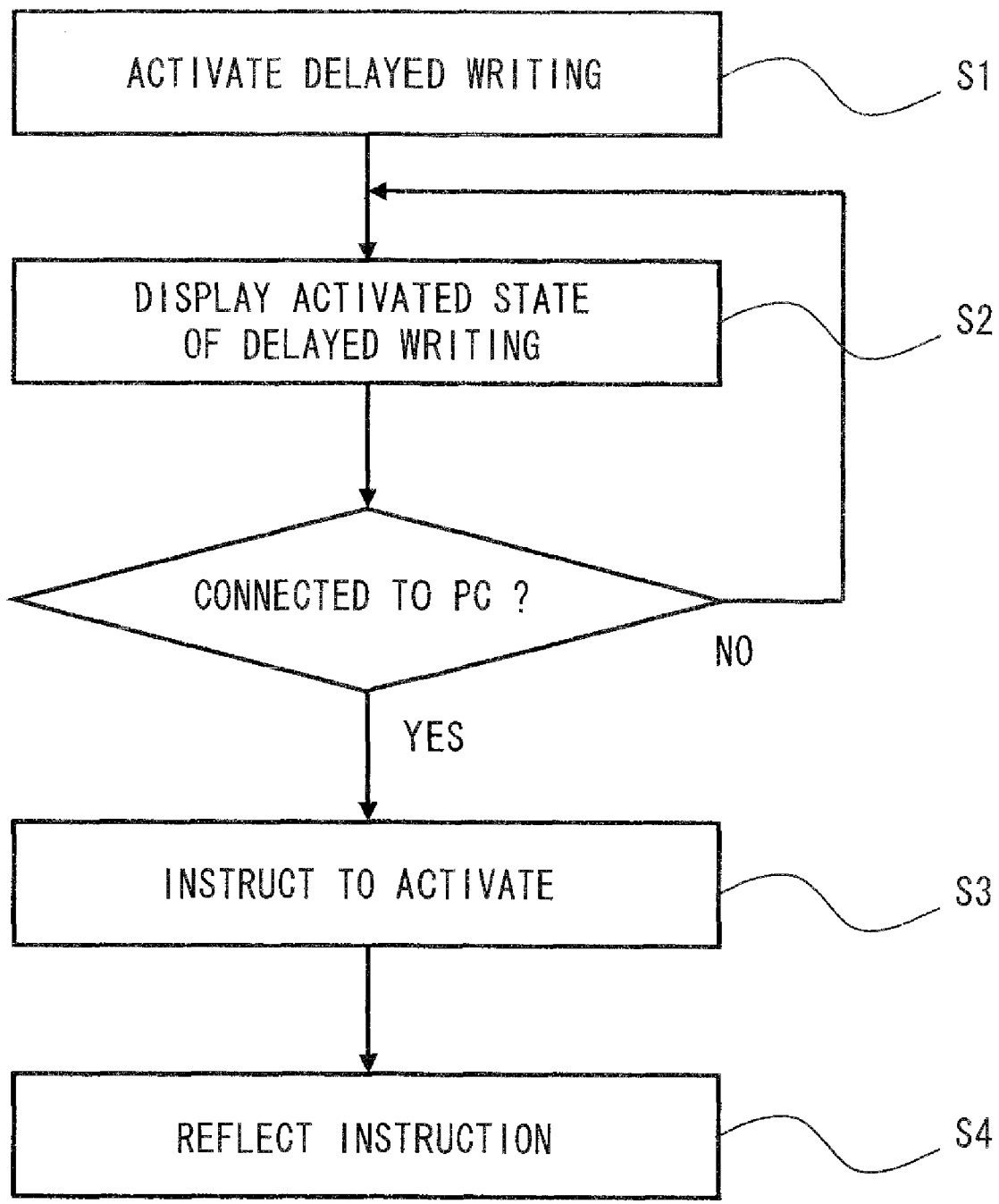
FIG. 3 is a schematic flowchart illustrating an operation of an information processing system when the delay writing is activated in accordance with an exemplary embodiment of the present invention.
Figure 4:
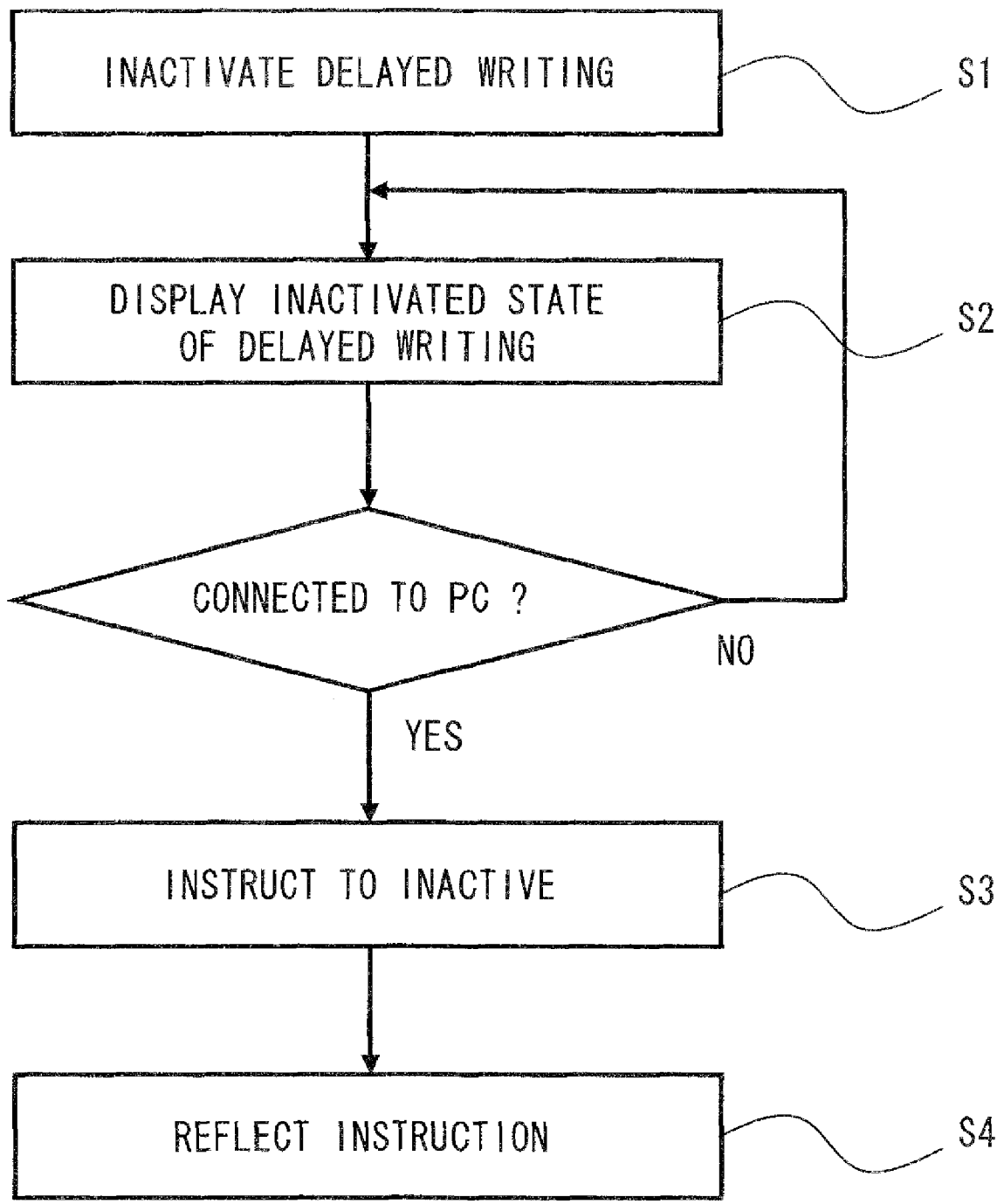
FIG. 4 is a schematic flowchart illustrating an operation of an information processing system when the delay writing is inactivated in accordance with an exemplary embodiment of the present invention.

An exemplary embodiment of the present invention is explained hereinafter with reference to FIGS. 1 to 4. FIG. 1 is a block diagram illustrating a schematic structure of an information processing system. FIG. 2 is an explanatory diagram illustrating a specific structure of a select switch. FIG. 3 is a schematic flowchart illustrating an operation of an information processing system when the delay writing is set to an enabled stage. FIG. 4 is a schematic flowchart illustrating an operation of an information processing system when the delay writing is set to a disabled stage.

As shown in FIG. 1, an information processing system 100 includes a personal computer (information processing device) PC and a removable disk (information storage device) RD. The personal computer PC is an ordinal computer. The removable disk RD is a compact storage device, such as a USB memory, capable of being attached to and detached from the personal computer PC. Note that the connection between the personal computer PC and the removable disk RD can be secured by connecting a male connector provided in one of the devices with a female connector provided in the other of the devices.

The personal computer PC includes an arithmetic processing unit 90, a cache memory (data storing area) 91, a main memory 92, a storage (data storage area) 93, an input unit 94, an output unit 95, and an interface unit 96. A fundamental software OS (Operating System) is installed in the personal computer PC to define its operation system.

The arithmetic processing unit 90 is connected to the interface unit 96 through an internal bus. The cache memory 91, the main memory 92, the storage 93, the input unit 94, and the output unit 95 are connected to the arithmetic processing unit 90 and the interface unit 96 through the internal bus.

The arithmetic processing unit 90 is a typical CPU (Central Processing Unit), and executes various programs in succession and realizes various functions. When the delay writing is activated, the arithmetic processing unit 90 reads data from the storage 93, temporarily stores the data in the cache memory 91, and transfers the data stored in the cache memory 91 to a storage 11 of the removable disk RD at proper timing. When the delay writing is inactivated, it reads data from the storage 93, and transfers the read data to the storage 11 of the removable disk RD.

The cache memory 91 is a volatile memory. The cache memory 91 stores data that are frequently used in the arithmetic processing unit 90. Furthermore, the cache memory 91 temporally stores data that is expected to be written to the removable disk RD. Note that the cache memory 91 may be integrated within the arithmetic processing unit 90.

The main memory 92 is a volatile memory. The main memory 92 temporally stores data. The processing speed of the main memory 92 is slower than that of the cache memory 91.

The storage 93 is a storage device having a large capacity (e.g., a hard disk drive). The storage 93 stores programs and data. In the storage 93, data is organized using a file system such as FAT (File Allocation Tables) or NTFS (NT File System).

The input unit 94 is an input device, such as a keyboard and a mouse, which are used by a user to control a personal computer. The output unit 95 is an output device, such as a display and a speaker, which are used by a user to control a personal computer. The interface unit 96 conforms to a communication standard called "USB (Universal Serial Bus) standard", and secures the connection between the personal computer PC and an external device. Note that the interface unit 96 is equipped with a connector.

The removable disk RD includes an interface unit 10, a storage 11, a control unit (controller) 12, a display 13, a button for removal 14, and a select switch 15. The removable disk RD is a compact portable storage device, such as a USB memory, capable of being attached to and detached from the personal computer PC. Data transferred from the personal computer PC is written into the nonvolatile memory of the removable disk RD. By transferring data from the personal computer PC to the removable disk RD, a user of the personal computer PC can easily move data to another personal computer, or isolate secret data from the personal computer PC.

The interface unit 10 conforms to a standard called "USB standard", and secures the connection of the removable disk RD to the personal computer PC. Note that the interface unit 10 is equipped with a connector.

The storage 11 is a nonvolatile memory (such as a flash memory). The storage 11 stores data transferred from the personal computer PC. When the removable disk RD is being connected to the personal computer PC, data writing to and data reading from the storage 11 are carried out by the personal computer PC.

The control unit 12 is a semiconductor integrated circuit such as an ASIC (Application Specific Integrated Circuit). In response to user's control to the removable disk RD, the control unit 12 controls the personal computer PC to perform an unmounting process, and also controls the personal computer PC for activating/inactivating the delay writing (details of which are described later). In other words, the control unit 12 functions as an instruction unit for instructing unmount processing by which the removable disk RD is removed from the personal computer PC, and also functions as an instruction unit for instructing the active or inactive states of the delay writing in the personal computer PC.

The display 13 is a compact display (e.g., a liquid crystal display) integrated in the removable disk RD. The display 13 displays the active or inactive states of the delay writing (details of which are described later), as well as other information such as date, time, and remaining storage capacity. That is, the display 13 also functions as a notification unit to notify the user of the active or inactive states of the delay writing.

The removal button 14 is a button to unmount the removable disk RD from the personal computer PC. When the removal button 14 is pressed, an unmount direction signal (High level signal if a binary logic signal is used) is output from the removal button 14. The control unit 12 instructs the personal computer PC to carry out an unmounting process through the interface unit 10 based on this unmount direction signal.

The select switch 15 is a switching component to select the active or inactive states of the delay writing performed by the personal computer PC. In other words, the select switch 15 selects an operation mode (operation mode where the delay writing is activated or operation mode where the delay writing is inactivated) of the personal computer PC in response to the user's control.

Figures 2A, 2B:
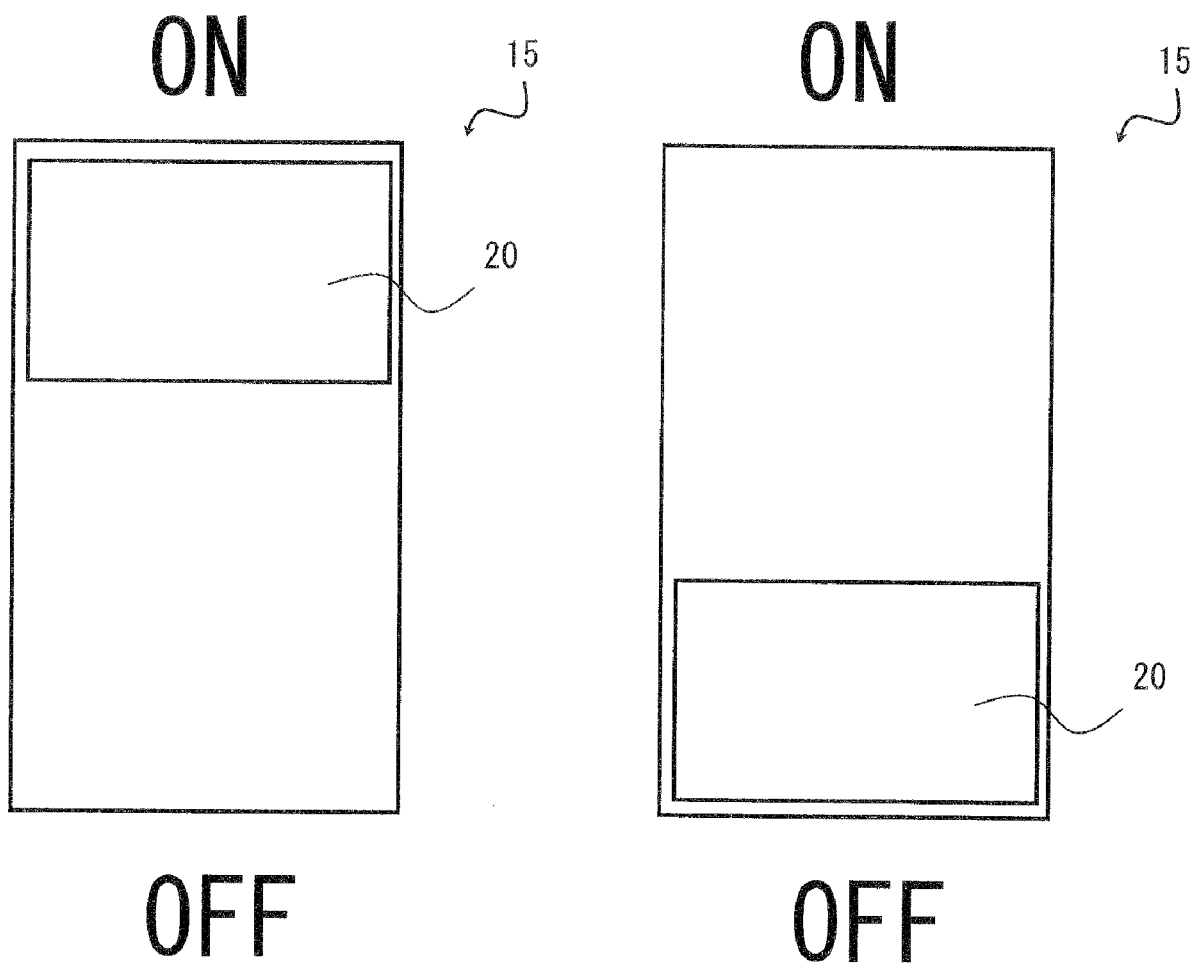
FIGS. 2A and 2B are explanatory diagrams illustrating a specific structure of a select switch in accordance with an exemplary embodiment of the present invention.

FIGS. 2A and 2B show a specific example of the select switch 15. The enabled state of the delay writing is selected by shifting a movable unit 20 to the ON-state side as shown in FIG. 2A, and the disabled state of the delay writing is selected by shifting the movable unit 20 to the OFF-state side as shown in FIG. 2B. Note that a specific structure of the select switch 15 may be arbitrarily determined. A touch panel type select switch 15 may be adopted with using the display 13.

When the enabled state of the delay writing is selected by shifting the movable unit 20 to the ON-state side, an activation signal (High level signal if a binary logic signal is used) is output from the select switch 15. The control unit 12 directs the personal computer PC to enable the delay writing through the interface unit 10 based on the activation signal from the select switch. Upon receiving the signal that directs to activate the delay writing from the control unit 12, the personal computer PC becomes an operation mode (data transfer mode) in which data to be transferred to the storage 11 is temporarily stored in the cache memory 91, and then the data stored in the cache memory 91 is collectively transferred to the storage 11 of the removable disk RD at proper timing. Note that the setting of the operation mode is performed by the OS of the personal computer PC.

When the disabled state of the delay writing is selected by the shift of the movable unit 20 to the OFF-state side, an inactivation signal (Low level signal if a binary logic signal is used) is output from the select switch 15. The control unit 12 directs the personal computer PC to disable the delay writing through the interface unit 10 based on this inactivation signal. Upon receiving the signal for disabling the delay writing from the control unit 12, the personal computer PC becomes an operation mode (data transfer mode) in which data to be stored in the storage 11 is transferred to the storage 11 of the removable disk RD at an arbitrary time without temporarily being stored in the cache memory 91.

As apparent from the above description, in this exemplary embodiment, the mechanism to control the active or inactive states of the delay writing performed by the personal computer PC is provided in the removable disk RD. Therefore, the active or inactive states of the delay writing can be easily selected in accordance with user's intention regardless of whether the user has knowledge on how to activate or inactivate the delay writing by manipulating OS of the personal computer PC.

For example, when a user wants to change the default status where the delay writing is activated, the user can easily inactive the delay writing performed by the personal computer PC by manipulating the select switch 15 provided in the removable disk RD. That is, it is possible to change the condition so that the removable disk RD can be easily removed from the personal computer PC without complicated procedures on the OS.

Next, an operation of the information processing system 100 when the delay writing is activated is explained hereinafter with reference to FIG. 3.

Firstly, the delay writing is activated (S1). Specifically, a user shifts the movable unit 20 of the select switch 15 of the removable disk RD to the ON-state side. When the movable unit 20 of the select switch 15 is shifted to the ON-state side, the above-described activation signal is output from the select switch 15.

Next, the activated state of the delay writing is displayed (S2). Specifically, the control unit 12 directs the display 13 to display the fact that the delay writing is activated, based on the activation signal. In such a case, it is necessary to perform an unmounting process on the OS or to press the removal button 14 before removing the removable disk RD from the personal computer PC. Therefore, a certain notice is displayed by the display 13 for notifying the user on this matter. Note that the step S2 in FIG. 3 may be performed only when the removable disk RD is actually being connected to the personal computer PC.

When the removable disk RD is being connected to the personal computer PC, the control unit 12 directs the personal computer PC to activate the delay writing through the interface unit 10 (S3). Specifically, the control unit 12 transmits an instruction signal for activating the delay writing to the personal computer PC through the interface unit 10 based on the above-described activation signal.

Next, the personal computer PC reflects the instruction directed by the removable disk RD (S4). Specifically, the personal computer PC performs to activate the delay writing based on the instruction signal transmitted from the control unit 12. Note that if the delay writing has already been activated, the personal computer PC maintains that state.

In this manner, the delay writing performed by the personal computer PC is activated by shifting the movable unit 20 of the select switch 15 of the removable disk RD.

Next, an operation of the information processing system 100 when the delay writing is inactivated is explained hereinafter with reference to FIG. 4.

Firstly, the delay writing is inactivated (S1) Specifically, a user shifts the movable unit 20 of the select switch 15 of the removable disk RD to the OFF-state side. When the movable unit 20 of the select switch 15 is shifted to the OFF-state side, the above-described inactivation signal is output from the select switch 15.

Next, the inactivated state of the delay writing is displayed (S2). Specifically, the control unit 12 directs the display 13 to display the fact that the delay writing is inactivated, based on the inactivation signal. In this case, it is unnecessary to perform any of the unmounting process on the OS or pressing the removal button 14 before the removable disk RD is removed from the personal computer PC. Therefore, a certain notice is displayed in the display 13 in order to notify the user of this matter. Note that the step S2 in FIG. 4 may be performed only when the removable disk RD is actually being connected to the personal computer PC.

When the removable disk RD is being connected to the personal computer PC, the control unit 12 directs the personal computer PC to disable the delay writing through the interface unit 10 (S3). Specifically, the control unit 12 transmits an instruction signal for disabling the delay writing to the personal computer PC through the interface unit 10 based on the above-described inactivation signal.

Next, the personal computer PC reflects the instruction directed from the removable disk RD (54) Specifically, the personal computer PC performs to inactivate the delay writing based on the instruction signal transmitted from the control unit 12. Note that if the delay writing has already been inactivated, the personal computer PC maintains that state.

In this manner, the delay writing performed by the personal computer PC is inactivated by shifting the movable unit 20 of the select switch 15 of the removable disk RD.

As apparent from the above description, the mechanism to control the active or inactive states of the delay writing performed by the personal computer PC is provided in the removable disk RD in this exemplary embodiment. Therefore, the active or inactive states of delay writing can be easily set in accordance with user's intention regardless of whether the user knows a specific way to activate or inactivate the delay writing on the OS of the personal computer PC.

For example, when a user wants to change the default status where the delayer writing is activated, the user can easily inactivate the delay writing performed by the personal computer PC by manipulating the select switch 15 provided in the removable disk RD. That is, it is possible to change the condition so that the removable disk RD can be easily removed from the personal computer PC without complicated procedures on the OS.

The technical scope of the present invention is not limited to above-described exemplary embodiments. The storage of the removable disk RD may be a flash memory or a hard disk drive. The connection between the removable disk RD and the personal computer PC may be made based on a standard other than the USB standard. Note that the provisions of the display 13 and removal button 14 in the removable disk RD are optional. The type of the OS installed in the personal computer PC is also optional. A specific structure of the select switch 15 may be also arbitrarily determined.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An information storage device that is detachable from an information processing device that transfers data stored therein to the information storage device, wherein the information processing device, in a first data transfer mode, transfers the data which has been cached by the information processing device, and, in a second data transfer mode, transfers data which has not been cached by the information processing device, the information storage device comprising:
    a storage that stores the data transferred from the information processing device;
    a switch unit that is manipulated by a user, and generates a selection signal indicating at least one of the first and second data transfer modes of the information processing device in accordance with said manipulation by the user; and
    a controller that directs the information processing device to transfer data in the first data transfer mode or in the second data transfer mode in accordance with the selection signal.

2. The information storage device according to claim 1, further comprising a notification unit that notifies the user of the data transfer mode which is selected by the user.

3. The information storage device according to claim 1, further comprising an interface unit, each of the storage and the controller being connected to the interface unit through an internal bus.

4. An information processing system, comprising:
    an information processing device that transfers, in a first data transfer mode, data which has been cached by the information processing device, and transfers, in a second data transfer mode, data which has not been cached by the information processing device; and
    an information storage device that is removably connected to the information processing device, the information storage device comprises:
        a storage that stores the data transferred from the information processing device;
        a switch unit that is manipulated by a user, and generates a selection signal indicating at least one of the first and second data transfer modes of the information processing device in accordance with said manipulation by the user; and
        a controller that is directs the information processing device to transfer data in the first data transfer mode or in the second data transfer mode in accordance with the selection signal by switch unit.

5. The information processing system according to claim 4, wherein the information storage device further comprising a notification unit that notifies a user of the mode selected by the switch unit.

6. The information processing system according to claim 4, wherein the information storage device further comprising an interface unit, each of the storage and the controller being connected to the interface unit through an internal bus.

7. A setting method of a data transfer mode of an information processing device that transfers data stored therein to an information storage device that is detachable from the information processing device, wherein the information processing device, in a first data transfer mode, transfers the data which has been cached by the information processing device, and, in a second data transfer mode, transfers data which has not been cached by the information processing device, the setting method comprising:
    generating a selection signal indicating at least one of the first and second data transfer modes of the information processing device in accordance with a manipulation of a switch unit provided in the information storage device by a user, wherein said generating is performed by the information storage device; and
    directing the information processing device to transfer data in the first data transfer mode or in the second data transfer mode in accordance with the generated selection signal, wherein said directing is performed by the information storage device.

8. The information storage device according to claim 1, wherein the information storage device is configured to store the data which has not been cached by the information storage device.

9. The information storage device according to claim 1, further comprising one of male and female connectors that is coupled to a connector of the information processing device.

* * * * *